United States Patent
Gassoway

(10) Patent No.: US 7,900,199 B2
(45) Date of Patent: Mar. 1, 2011

(54) METHOD AND APPARATUS FOR REUSING A COMPUTER SOFTWARE LIBRARY

(75) Inventor: Paul Gassoway, Norwood, MA (US)

(73) Assignee: Computer Associates Think, Inc., Islandia, NY (US)

(*) Notice: Subject to any disclaimer, the term of this patent is extended or adjusted under 35 U.S.C. 154(b) by 1685 days.

(21) Appl. No.: 11/133,946

(22) Filed: May 20, 2005

(65) Prior Publication Data

US 2005/0262522 A1    Nov. 24, 2005

Related U.S. Application Data

(60) Provisional application No. 60/573,630, filed on May 21, 2004.

(51) Int. Cl.
G06F 9/44 (2006.01)
G06F 9/45 (2006.01)

(52) U.S. Cl. ............... 717/164; 717/120; 717/165

(58) Field of Classification Search .......... None
See application file for complete search history.

(56) References Cited

U.S. PATENT DOCUMENTS 6,154,878 A * 11/2000 Saboff ............... 717/173
6,185,734 B1 * 2/2001 Saboff et al. ......... 717/164
2002/0120685 A1 * 8/2002 Srivastava et al. ...... 709/203

OTHER PUBLICATIONS

Notification of Transmittal of the International Search Report for application PCT/US2005/017725 (6 pages), Sep. 30, 2005.
Written Opinion of the International Searching Authority for application PCT/US2005/017725 (8 pages), Sep. 30, 2005.
The Role of Activex and COM IN ATE; Kirk G. Fertitta and John M. Harvey; 0-7803-5432-X; pp. 35 to 51, 1999.

* cited by examiner

*Primary Examiner* — Chuck O Kendall
(74) *Attorney, Agent, or Firm* — Baker Botts L.L.P.

(57) ABSTRACT

A method for creating a reusable library, including providing one or more functions, providing a function table for the provided one or more functions, and providing a configuration structure for communicating values between the provided one or more functions and a program that calls the reusable library. The program that calls the reusable library communicates a function table structure to the reusable library containing information as to which of the one or more functions are desirable. When those of the one or more functions that are not desirable contain dependencies, those dependencies are canceled.

65 Claims, 7 Drawing Sheets

METHOD AND APPARATUS FOR REUSING A COMPUTER SOFTWARE LIBRARY

REFERENCE TO RELATED APPLICATION

The present disclosure is based on and claims the benefit of Provisional Application 60/573,630 filed May 21, 2004, the entire contents of which are herein incorporated by reference.

TECHNICAL FIELD

The present disclosure relates to computer software and, more specifically, to methods and apparatuses for reusing a computer software library.

DESCRIPTION OF THE RELATED ART

Modern computer programs can be sophisticated and large. It is common for such programs to be constructed by a team of computer programmers who each work on creating discrete sections of the computer program such as functions. A function is a discrete program section that is capable of performing one or more relatively small tasks.

A function may accept one or more parameters as input from the computer program or other function that may have called the function and outputs one or more results to the computer program or other function. For example, an adding function may accept two numbers as parameters, add the numbers together and output a number as a result.

Functions can input and output data by accessing global variables and global constants. Global variables are placeholders initialized by the computer program that can receive and hold data, for example, an integer or text string. An example of a variable may be "total" where the data associated with total is an integer number that can be replaced with a new number as appropriate. The computer program, as well as any function called by the computer program, can access global variables. This access can consist of both reading the data held by the variables and writing replacement data to the variable. Global constants are placeholders established by the computer program. Unlike variables, the data held by a constant is defined by the computer program and cannot be replaced with new data. An example of a constant may be "pi" where the data associated with pi is a real number that is defined to be 3.14 and can never be changed. Like global variables, global constants can be accessed by the computer program as well as any functions called by the computer program. This access can consist of reading the data held by the constant.

Functions can also input and output data by accessing local variables and constants. Local variables are placeholders initialized by the function that can receive and hold data. Local variables only exist within the function and can therefore only be accessed by the function within which they exist. Neither other functions, nor the computer program can directly access local variables. Additionally, because local variables are initialized at the start of the function, they no longer exist when the function has terminated, Even the same function cannot share access to the same local variable when run more than once. Local constants are like local variables except their value is fixed when the constant is defined by the function.

When a function is called, all parameters sent to that function may be accessible to the function. If the data to be input is a global variable or a global constant, the function can automatically access the data. If the data sent is a local variable or local constant, this data may be passed to the function when it is called. Likewise, output data delivered by the function can be stored as a global variable or passed to the computer program or other function that called the function as the function's result. Data is passed to a function as one of the function's parameters when the function is called. The function may then initialize a local variable to store data passed to it.

A function need not make use of the global character of global variables and global constants and may instead pass global data to local data for use within the function. Use of local data by functions may be preferred over use of global data because functions using global data can be more difficult to reuse.

The inputs used by a function are called the function's dependencies. This is because the function cannot be properly executed unless it has access to all inputs that the function has been programmed to utilize. Dependencies commonly include variables and constants that are passed to the function through the function's parameters. Dependencies can also occur when the programmer of the function makes certain assumptions about the program and operating system (the environment) that the function is to be executed within. In these cases, proper use of the function may be dependant upon having the same environment.

A single function may be called multiple times by a program or by multiple programs. A function may be compiled along with a program that calls the function into a single program file. When a function is incorporated into a program file it is difficult for multiple programs to share the use of a function. Alternatively, functions can be incorporated into library files. In addition to making it easier for multiple programs to share the use of functions, the use of library files makes it easier for programmers to develop and enhance programs by providing a more organized program structure.

Libraries may contain multiple functions and generally contain a set of functions that serve related purposes. One example of a library is the standard input/output library "stdio." This library contains some basic input and output functions used by programs written in the C programming language. Libraries may also be made up of modules. Modules may be sub-groupings of functions. The use of modules can facilitate the development and organization of libraries.

Like functions, libraries may have dependencies. These dependencies are generally the dependencies of the functions within the library and as such include the parameters required by the functions. Also, assumptions made that are specific to the environment may give rise to additional library dependencies.

It is beneficial to be able to reuse libraries from program to program and from operating system to operating system. However, most libraries are written with a particular program in mind. Libraries are therefore often dependant upon the environment they were originally programmed to be used in. This makes reuse of libraries difficult. Programmers wishing to use a library written for one program with another program may need to edit the programming of the library to alter the dependencies. Alternatively, programmers may incorporate additional libraries in the other program simply to satisfy dependencies of the desirable library, even though the other libraries provide no other benefit to the new program. Additionally, where libraries are modified for reuse in other programs, updates made to a library in one program cannot be easily exploited by the other programs that use the same library.

There is a need for reliable and effective ways to be able to reuse a library across different environments and platforms.

SUMMARY

A method for creating a reusable library, including providing one or more functions, providing a function table for the provided one or more functions, and providing a configuration structure for communicating values between the provided one or more functions and a program that calls the reusable library. The program that calls the reusable library communicates a function table structure to the reusable library containing information as to which of the one or more functions are desirable. When those of the one or more functions that are not desirable contain dependencies, those dependencies are canceled.

A method for modifying a conventional library with one or more functions for reuse, including decoupling a library from at least one of a dependant application or one or more other libraries, and providing a configuration structure for communicating values between the one or more functions and a program that calls the reusable library. The program that calls the reusable library communicates a function table structure to the reusable library containing information as to which of the one or more functions are desirable. When those of the one or more functions that are not desirable contain dependencies, those dependencies are canceled.

A reusable library system, including one or more functions, a function table for the one or more functions, and a configuration structure for communicating values between the one or more functions and a program that calls the reusable library. The program that calls the reusable library communicates a function table structure to the reusable library containing information as to which of the one or more functions are desirable. When those of the one or more functions that are not desirable contain dependencies, those dependencies are canceled.

A computer system including a processor and a program storage device readable by the computer system, embodying a program of instructions executable by the processor to perform method steps for creating a reusable library. The method includes providing one or more functions, providing a function table for the provided one or more functions, and providing a configuration structure for communicating values between the provided one or more functions and a program that calls the reusable library. The program that calls the reusable library communicates a function table structure to the reusable library containing information as to which of the one or more functions are desirable. When those of the one or more functions that are not desirable contain dependencies, those dependencies are canceled.

A computer system including a processor, and a program storage device readable by the computer system, embodying a program of instructions executable by the processor to perform method steps for modifying a conventional library with one or more functions for reuse. The method includes decoupling a library from at least one of a dependant application or one or more other libraries and providing a configuration structure for communicating values between the one or more functions and a program that calls the reusable library. The program that calls the reusable library communicates a function table structure to the reusable library containing information as to which of the one or more functions are desirable. When those of the one or more functions that are not desirable contain dependencies, those dependencies are canceled.

BRIEF DESCRIPTION OF THE DRAWINGS

The features of the present application can be more readily understood from the following detailed description with reference to the accompanying drawings wherein.

DETAILED DESCRIPTION

The present disclosure provides tools (in the form of methodologies, apparatuses, and systems) for reusing a computer software library.

The following exemplary embodiments are set forth to aid in an understanding of the subject matter of the present disclosure, but are not intended, and may not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Figure 1:
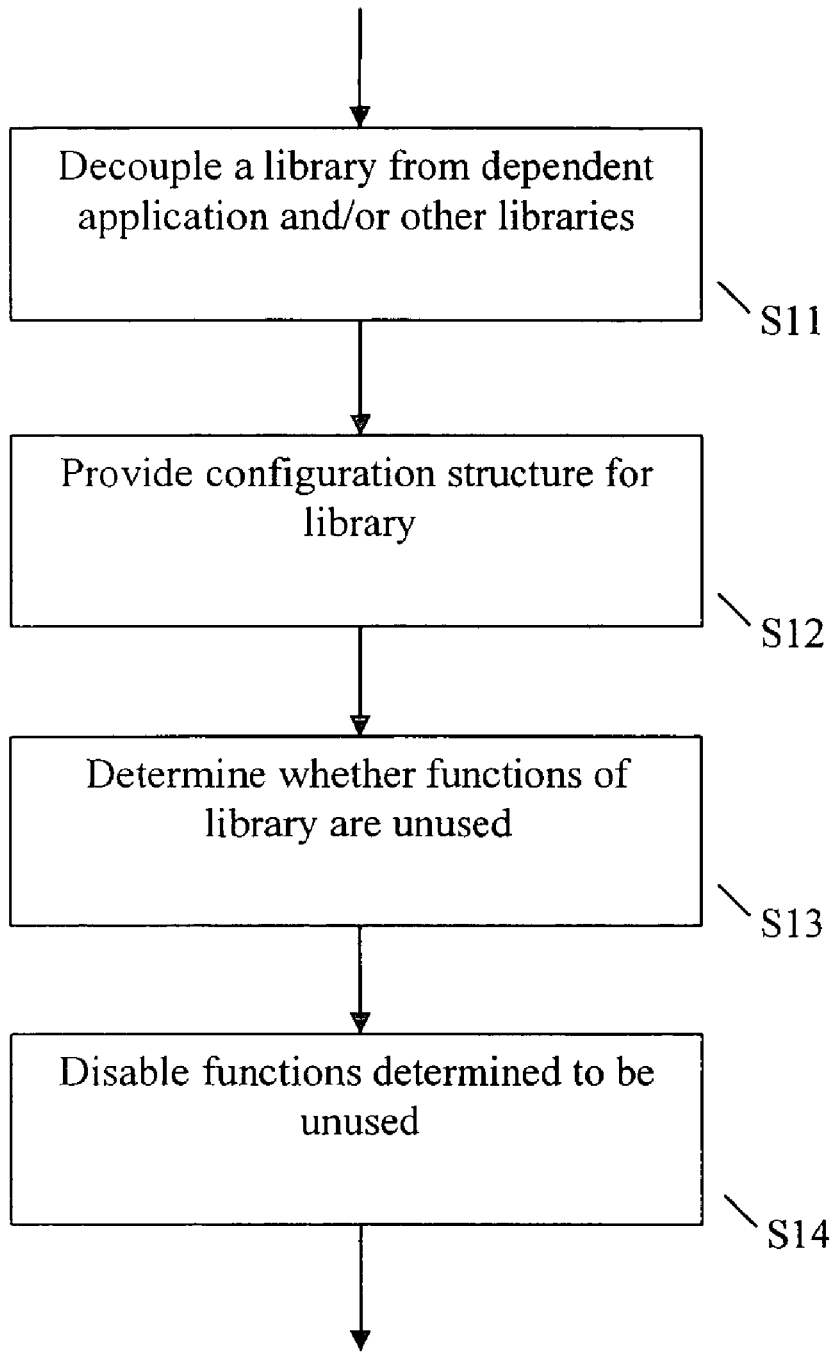
FIG. 1 shows a flow chart illustrating a method for reusing a computer software library, according to an embodiment of this disclosure.

An overall description of a method for reusing a computer software library will be explained below with reference to FIG. 1. The library is decoupled from one or more dependent applications and/or other libraries (Step S11). A configuration structure is provided for the library (Step S12). Whether one or more functions of the library are unused is determined (Step S13). The functions determined to be unused are disabled (Step S14).

The current disclosure also introduces a product independent architecture (PIA) for libraries so that the libraries can be easily used in a variety of computer program products running on a variety of operating systems. The PIA allows programmers to use libraries that have been updated for one program in order to update other programs as well. New libraries can be created in compliance with the PIA and old libraries can be made PIA compliant. PIA compliant libraries may then be easily used by a wide variety of programs running on a wide variety of environments.

Figure 2:
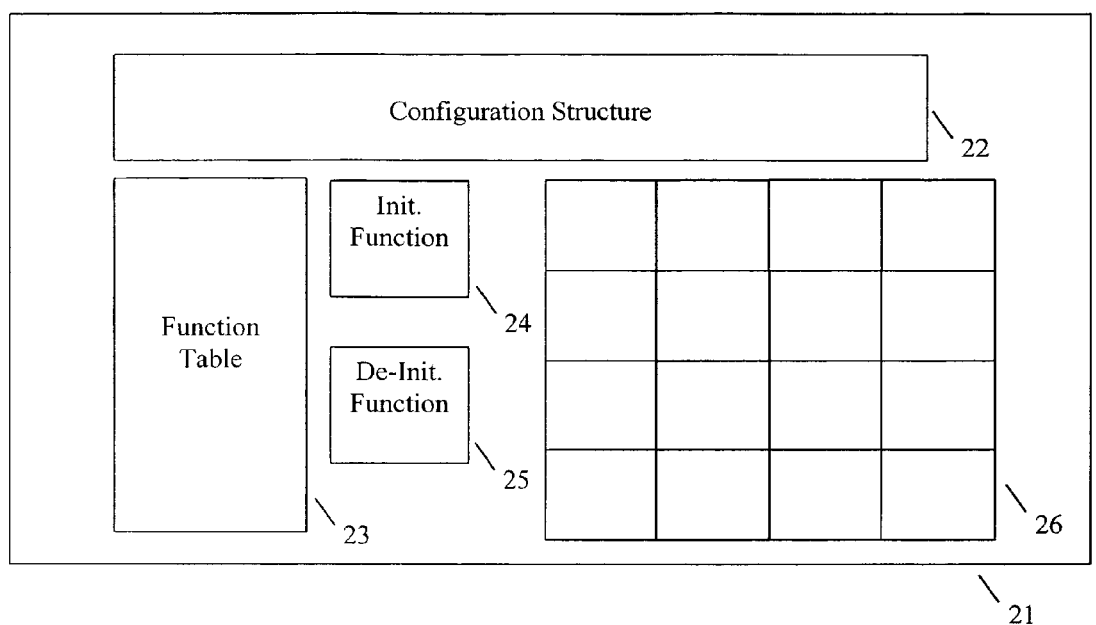
FIG. 2 shows a block diagram illustrating an apparatus for reusing a computer software library, according to one embodiment of the present disclosure.

The basic structure of PIA libraries, according to an embodiment of this disclosure, is illustrated in FIG. 2. PIA compliant libraries 21 may have a single configuration structure 22. The configuration structure may be a section of the library 21 responsible for ascertaining the dependencies, for example, the parameters, variables, and constants used by the library 21. The configuration structure 22 may also be responsible for passing data, for example, function results, back to a program that has called upon the library 21. The configuration structure 22 may be the only point of interaction between the library 21 and the program that has called the library 21. The program may therefore interact with the library 21 through the configuration structure 22. Data that is communicated through the configuration structure 22 may include data fields. Each function 26 within the library 21 may have its own variables, constants, parameters, other dependencies and results (points of data). Each of these points of data may be assigned a data field on the configuration structure 22 so each function 26 can communicate each of its points of data with the program.

Libraries 21 may have multiple functions 26. When libraries 21 are called by other programs, those programs might make use of only some of the library's 21 functions 26. For this reason, the other program might not be able to satisfy the library's 26 dependencies that are related to unused functions 26 within the library 21.

In order to facilitate the sharing of libraries 26, PIA compliant libraries 21 need not be prevented from executing because dependencies required for unused library 21 functions 26 are not present. To accomplish this, dependencies for unused library 21 functions 26 may receive a reasonable default value from the configuration structure 22. By providing reasonable default values to the dependencies of unused library 21 functions 26, the dependencies may be canceled. Alternatively, the library 21 may disable the functions 26 within the library 21 that are unused. By disabling these functions 26, their related dependencies may be canceled.

The configuration structure 22 may contain a version number, preferably as its first field, to help programs identify when a new version of a library 21 has been added so that the program can expect additional fields in the library's 21 configuration structure 22. This version number is preferably accessible to the program by the use of a get_config_version function within the library 21 that returns the configuration structure version number.

When PIA compliant libraries 21 are updated, a programmer might wish to add or remove functions 26 to the library 21. New functions 26 may use additional fields to be added to the configuration structure 22. New fields may be added to the end of the configuration structure 22. According to an embodiment of the present disclosure, obsolete fields are not removed. These features help ensure that old programs remain compatible with future library 21 revisions.

Although the configuration structure 22 may control all data that is sent or received by the functions 26 within the library 21, it is still possible for libraries 21 to make use of external data without that data being passed into the library 21. The program calling the library 21 may send the library 21 a hook that the library 21 can call to access the external data. For example, if the library 21 is to read data from an external database, the program may send the library 21 a hook that points directly to that external database. By using a hook rather than having the library 21 read data from a specific location directly, the library 21 can be used by other programs that do not share the same external data. For example, a second program making use of the library 21 may call on the library 21 and send as a hook the location of its external database so the same library 21 file can work with two distinct programs each with its distinct external data.

If the second program using the library 21 does not make use of the library's 21 ability to access external data and no hook is sent by the program, or "null" is passed as the hook, then the library 21 may disable the external data access functionality so that compatibility is maintained.

The program calling a function 26 through the library's 21 configuration Structure 22 may preferably call the function 26 directly by using a function call name associated with the function 26. This method may be advantageous over having the configuration structure 22 send the program a fixed function pointer to call the function 26 with. By having the program call the function 26 through the library's 21 configuration structure 22, there may then be less ambiguity when multiple libraries 21 are used.

Preferably, the library 21 should not check to see if functions 26 are missing front the configuration structure 22. Doing so may add excess complexity to the library 21 and may cause all library 21 functions 26 to become unusable when other remaining functions 26 may still be usable.

PIA compliant libraries 21 should preferably not be interdependent; they should preferably not have dependencies that are satisfied by other libraries. To help achieve independence, PIA compliant libraries 21 may have a function table 23 which indexes all of the functions 26 that are incorporated into the library 21. The function table 23 may be made up of fields. The function table 23 may preferably have, as its first field, a number representing the function table 23 version.

When modifying PIA compliant libraries 21, functions 26 should not be removed. This may ensure that new versions of libraries 21 can be used in old programs. New functions 26 added to libraries 21 may also add its reference to the end of the function table 23 and the function table version number may be advanced. The function table version number is preferably accessible to the program by the use of a get_func_version function within the library 21 that returns the function table version number.

Use of function tables 23 may help PIA compliant libraries 21 avoid interdependence. A pointer pointing to a function table structure may be passed to the library 21 from the program. The function table structure tells the library 21 what parameters are available for each function 26 to use. The library 21 may access the function table structure and use it to disable those functions 26 whose dependencies cannot be satisfied by the parameters made available by the program.

By using a pointer to point to the function table structure, multiple programs may be able to call upon the same library 21 while being able to customize the functionality of the library 21 for their respective use.

Programmers may wish to allow programs to access libraries 21 across a computer network (remote libraries) rather than accessing libraries 21 locally. Problems may arise when a program attempts to access a remote library when there is a disruption in the computer network, for example a network server being down. It is therefore preferable to have all functions 26 listed in the function table 23 return an error code if access is disrupted. This technique may provide for error trapping for instances when the network connection to remote libraries is disrupted.

PIA compliant library 21 may preferably have an initialization function 24. In the initialization function 24, all of the local variables and constants used by the library 21 may be defined and assigned initial values. The library 21 may preferably only make use of variables and constants initialized in the initialization function 24. Limiting initialization to the initialization function 24 is preferable because it may prevent dependency problems that may arise when a function 26 expects a variable to be initialized outside the library 26 but it is not. It is preferable for initialization functions 24 to be able to send an error value in the event that a variable or constant is not able to initialize. This ability is preferably added even if as programmed it is not possible for the initialization function 24 to fail. This is because a later update to the library 21 may introduce a possibility that the later version of the initialization function 24 may fail.

The PIA compliant library 21 may preferably have a de-initialization function 25. This function may be executed after the desired library 21 functions 26 have terminated. The de-initialization function 25 may close all of the variables and constants that were opened with the initialization function so that the function 26 does not terminate with values left in the variables.

It is preferable for all entry points to call an abort command if the initialization function 24 has not first been called. Entry points are places in which a programmer may initiate library 21 functions 26 while in the process of modifying the library 21. By using the abort command, the programmer may be able to know if initialization has not occurred while in the process of modifying the library 21.

Figure 3:
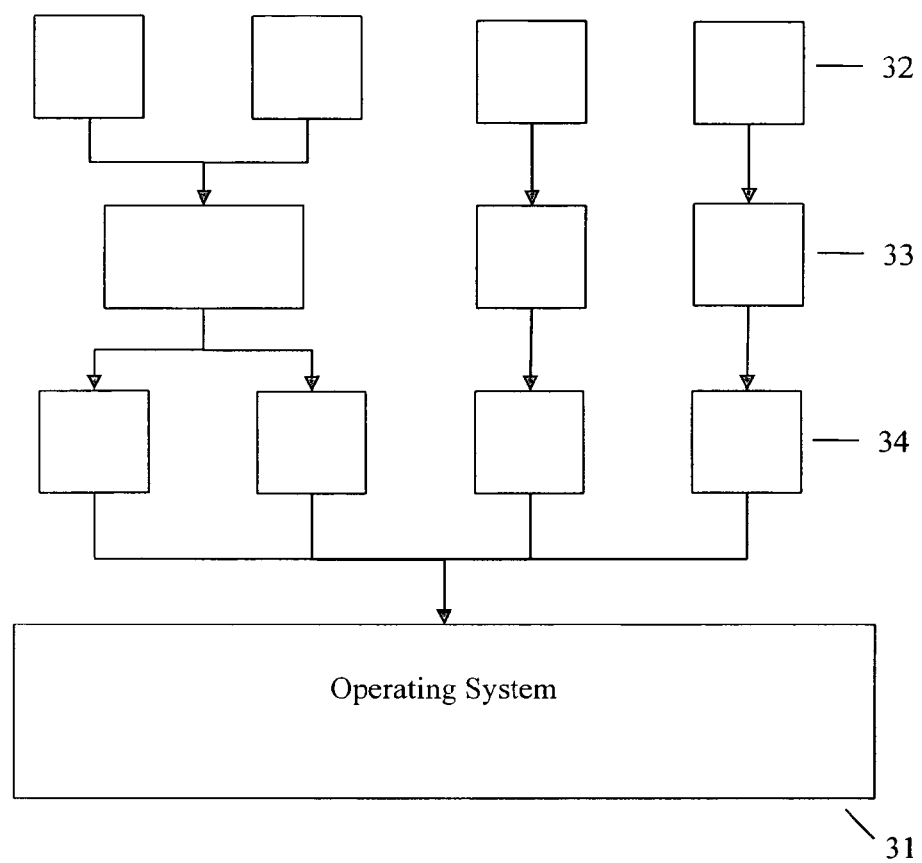
FIG. 3 shows a block diagram illustrating interdependency of libraries.

New libraries can be developed according to the PIA guidelines of the current disclosure. Additionally, conventional libraries can be modified to become PIA compliant. There are many possible methods for modifying libraries to make them PIA compliant. Conventional libraries may be dependant on an operating system or on other libraries. The interdependency of libraries is illustrated in FIG. 3. At the base of the figure is the operating system (OS) 31. The OS generally has no library dependencies. Libraries that only depend on the OS 31 form the first row up 34. These libraries do not depend on other libraries. The next row up 33 contains libraries that are dependant on the first row libraries 34. The top row 32 contains libraries that are dependant on the next row libraries 33. When modifying conventional libraries to make them PIA compliant, it may be preferable to begin by modifying the libraries that no other libraries are dependant on, the top row libraries 32. This method is the top down approach to modifying libraries. Libraries may also be modified from the bottom up, which is to begin by modifying the libraries that only depend on the operating system 31, the first row libraries 34.

A module is a group of functions that is smaller than a library. A library may contain one or more functions. It is possible for a module to be PIA compliant by being included into a PIA compliant library. A single-module library may be used to make a module PIA compliant. Sharing a module among multiple libraries is discouraged because if such a module is changed, then all of the libraries that use the module may also need to be changed.

Some libraries do not need to be made PIA compliant. Libraries that are inherently product specific cannot be reused by other programs and platforms and therefore may not benefit from PIA compliance. One example of a product specific library is the resource library. A resource library is a library that contains product specific functions. Because PIA compliant libraries should not be product specific, resource libraries should not be made PIA compliant. However, a PIA compliant library may receive a hook to a resource library through the library's configuration structure.

Some libraries are designed to be a product plug-in. A plug-in is a program that is designed to augment another program. Plug-ins are generally only run in conjunction with the other program and are generally not run alone. Therefore a plug-in is product specific by definition and often cannot be made PIA compliant.

Another example of a library that is product specific is a library designed to emulate another operating system. Because such a library may emulate another operating system, it may behave like that operating system and changing the character of that library to make it PIA compliant might interfere with its ability to genuinely emulate the other operating system.

Figure 4:
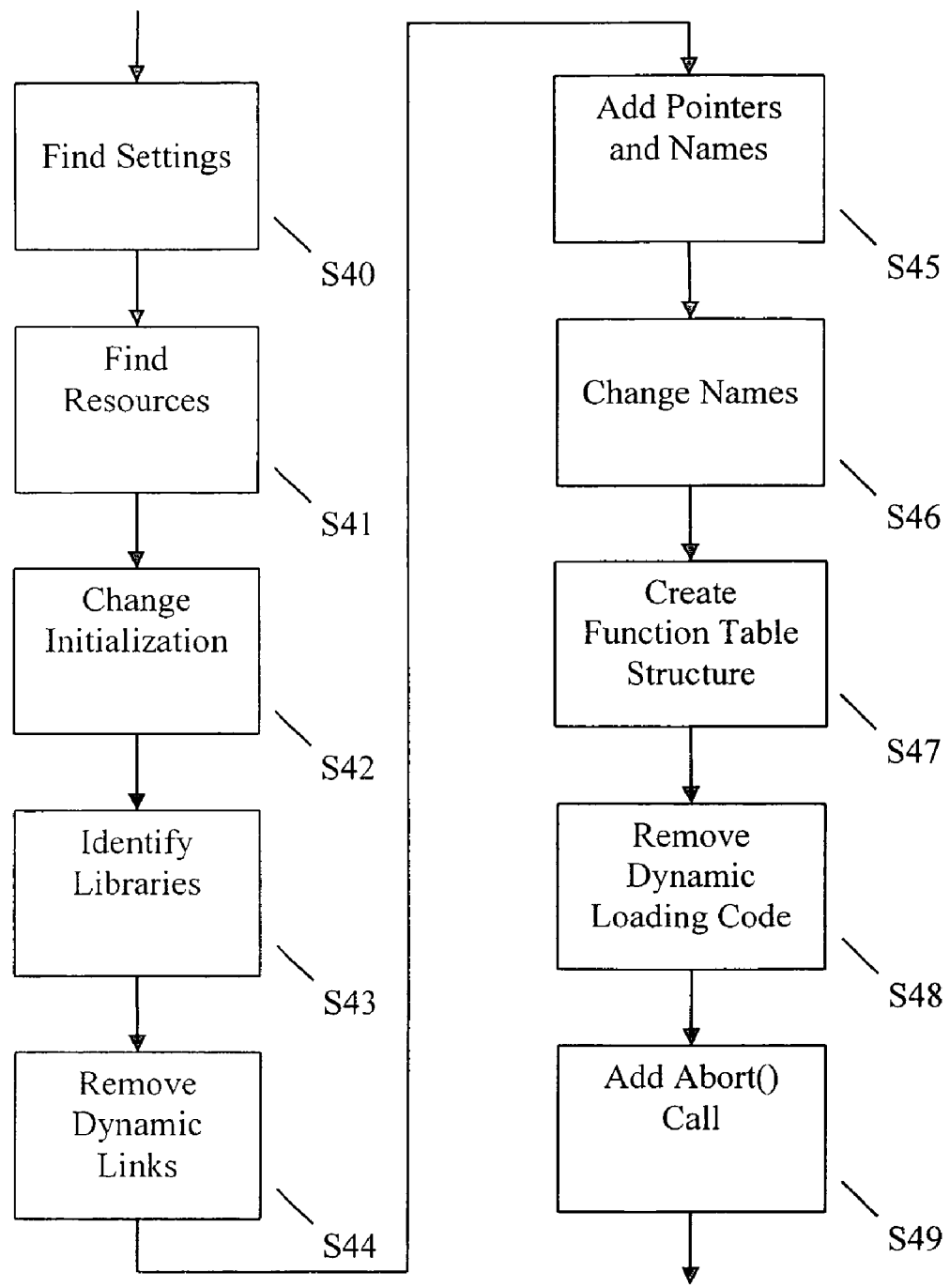
FIG. 4 shows a flow chart illustrating a method of reusing a computer software library, according to one embodiment of the present disclosure.

Although there are many available methods for modifying libraries to make them PIA compliant, FIG. 4 illustrates a method for modifying conventional libraries to make them PIA compliant, according to an embodiment of the present disclosure.

All of the settings such as variables, constants, parameters and returns used by the library may be determined (Step S40). Some settings, such as local variables and local constants, may only be required by the library when the library is first called and the values of these settings may be passed to local variables and local constants defined by the library. The definition and receiving of local values may be called the initialization of the library. Settings that are only required at the library initialization may be added to the configuration structure of the library. If the settings are used at later points in the library's execution, such as with global data, then a hook pointing to the data may be added to the configuration structure to get the settings. Places within the library where later used settings are used may be located and the call may be replaced with calls to the corresponding hook.

All of the resources used by the library may be found (Step S41). A resource is external data that is called upon by the library. Resources may be, for example, strings graphical structures that are directly loaded by the library. Pointers to these resources may be added to the configuration structure and every place within the library that loads the resources may be modified to load what is pointed to by the pointer.

The initialization function of the library may be changed to accept the configuration structure (Step S42). Any parameters passed into the initialization function may be removed and added to the configuration structure.

Libraries that depend on other libraries may be identified (Step S43). Pointers to these other libraries may be added to the dependency's function table structure. Every place within the library that calls on the other library may be modified to load the dependency's function table structure instead.

Libraries may contain dynamic links to dependencies. Dynamic links are links that direct a function to suspend execution and receive data or execute a function in another library. Dynamic links to dependencies may be located and removed (Step S44). For a library to be PIA compliant, all dependencies may need to be passed to the library through the configuration structure as described above.

Libraries may contain statically linked dependencies. Data associated with statically linked dependencies may be gathered prior to the libraries compilation and may become part of the compiled library. After the library has been compiled, the library is no longer dependent on external data. Therefore it is possible for libraries with statically linked dependencies to be PIA compliance.

One form of a statically linked dependency is the use of a statically linked library. Use of statically linked libraries may create additional requirements for PIA compliance. Libraries that depend on a statically linked library may contain the statically linked library's configuration structure within its own configuration structure. The library's initialization function may call the static library's initialization function. The library's de-initialization function may call the static library's de-initialization function. The statically linked library may be able to handle multiple initializations and may not de-initialize until the de-initialization function has been called as many times as the initialization function has been called. Libraries that call the statically linked library may call the statically linked library's get_functions function to obtain pointers into the library and not use the library's functions directly. To accomplish this, the statically linked libraries may have its functions named differently than the function pointers called by the library or program calling the statically linked library. For example, the extension "_func" can be added to the end of the function names within a statically linked library.

A module containing function pointers to the functions within the library and the names of all of the functions within the library may be added to the library (Step S45). This module may be linked to by other libraries that depend on the libraries.

The name of the library's functions may be changed to satisfy platforms that cannot accommodate functions and function pointers that have the same name (Step S46). For example, a function named sort may be changed to sort_func while the pointer for this function retains the name sort. Although this step is beneficial, it is generally not performed unless the library is to be statically linked.

A function table structure may be created (Step S47). This function table structure may contain pointers to all of the functions that makeup the library. A function generally named "get functions" is included in the library. This function is designed to fill the function table structure with appropriate values. The get_functions function may examine the version of the function table structure so that additional function pointers are not added to the function table structure if a newer version of the library is used. The get_functions function may be contained within its own module.

Code that dynamically loads another library or gets function pointers may be removed from libraries (Step S48). This is because loading other libraries or getting function pointers may create dependencies that are not controlled by the library's configuration structure.

An "abort( ) call" calls an abort function to terminate execution of a program. Programmers may use an abort( ) call to help them know when the program has encountered a problem. An abort( ) call may be added to all of the functions in PIA compliant libraries so that an abort( ) is called in the event that the function fails to be properly initialized (Step S49). A function may fail to be properly initialized if, for example, the correct parameters are not received by the library's initialization function.

One possible feature of PTA is that new versions of libraries may be used by old programs that have previously used old versions of libraries. PTA compliant libraries may remain backwards compatible. As libraries are updated, certain rules may be followed to ensure libraries remain PTA compliant.

Figure 5:
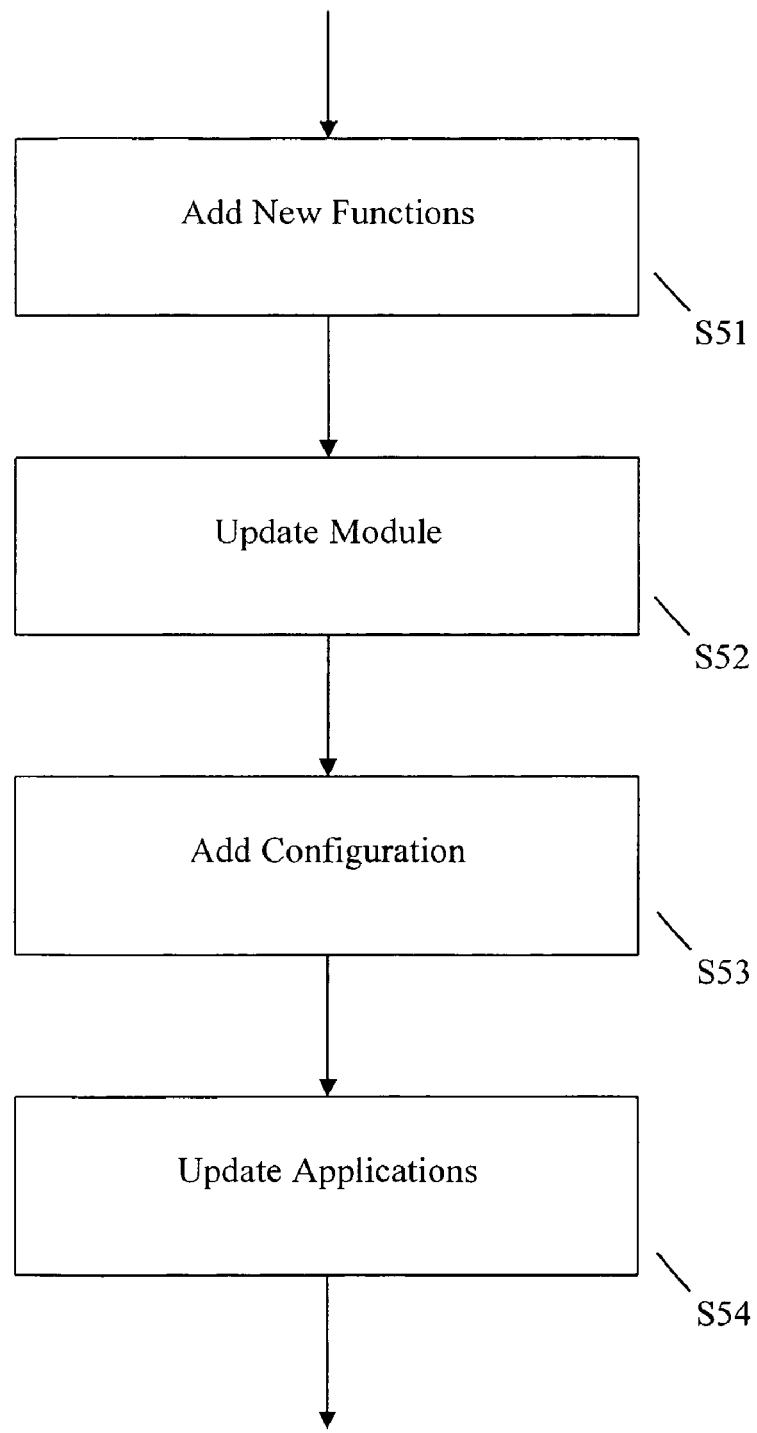
FIG. 5 shows a flow chart illustrating a method of reusing a computer software library, according to one embodiment of the present disclosure.

When new functions are added to a library, the steps illustrated in FIG. 5 may preferably be followed. New functions may be added to the end of the library's function table (Step S51). Modules containing the library's function pointers may be updated for the new functions (Step S52). The function to call the new function's pointer may return a null result if the structure passed has the current version or less. This may ensure that the added functionality may not be active when used with older programs. Configuration needed by the new function may be added to the end of the library's configuration structure (Step S53). If the current version or less of the configuration structure is passed, the function may be able to handle the older version of the configuration structure. For example, the function may return an error signal or use some reasonable defaults for the missing values. The function may not work in such a way as to corrupt memory or data. Applications requiring the new functions of the library may be updated so they pass in the new version of the function table structure to the libraries that need the new function (Step S54).

A programmer may wish to remove functionality from a later version of a library. This process is called deprecating, the function. For example, the function might not work properly and might not be easily fixable. Alternatively, the function might not work properly but other programs using the function depend on the improper functionality. If the programmer removes the functionality the library may no longer be compatible with old programs that use the library. Instead, the function may preferably be documented to inform subsequent developers that the function should not be used. Additionally, non-production builds of the library (versions of the library that are intended to be used for development but not for release with a product) may have an abort( ) call added to the beginning of the function to inform subsequent developers that the function should not be used.

Programmers often seek to update libraries to fix a bug. A bug is an element of the library functions that does not perform as intended. Because the PIA allows for libraries to be used by multiple programs, fixing bugs in a library used by one program can impair the correct functioning of other programs that share the library. If it is not possible to fix the bug without harming one of the programs that use the library, then the program that requires the library to be fixed may use a new library instead of a new version of the library with the bug.

Where a bug has been fixed, and the new version of the library released, it may later be determined that one or more programs that use the library are harmed. When this happens, the function with the fix may use a new library instead of using the fixed version of the old library. The new version of the library may be replaced by the old version of the library everywhere it is used.

Using PIA compliant libraries may make programs easier to support. New versions of libraries can be used to fix bugs and help increase functionality of the programs that call the libraries. When a function in a library is deprecated to fix a bug, a special version of the module containing the get_functions function may be written for the library. This module sets the pointer to the broken function to another function that behaves the same way as the broken function except for the fact that the other function performs as desired. When the library being updated is a statically linked library, every function and program that calls the library may be recompiled using the new statically linked library in order to fix the bug.

Figure 6:
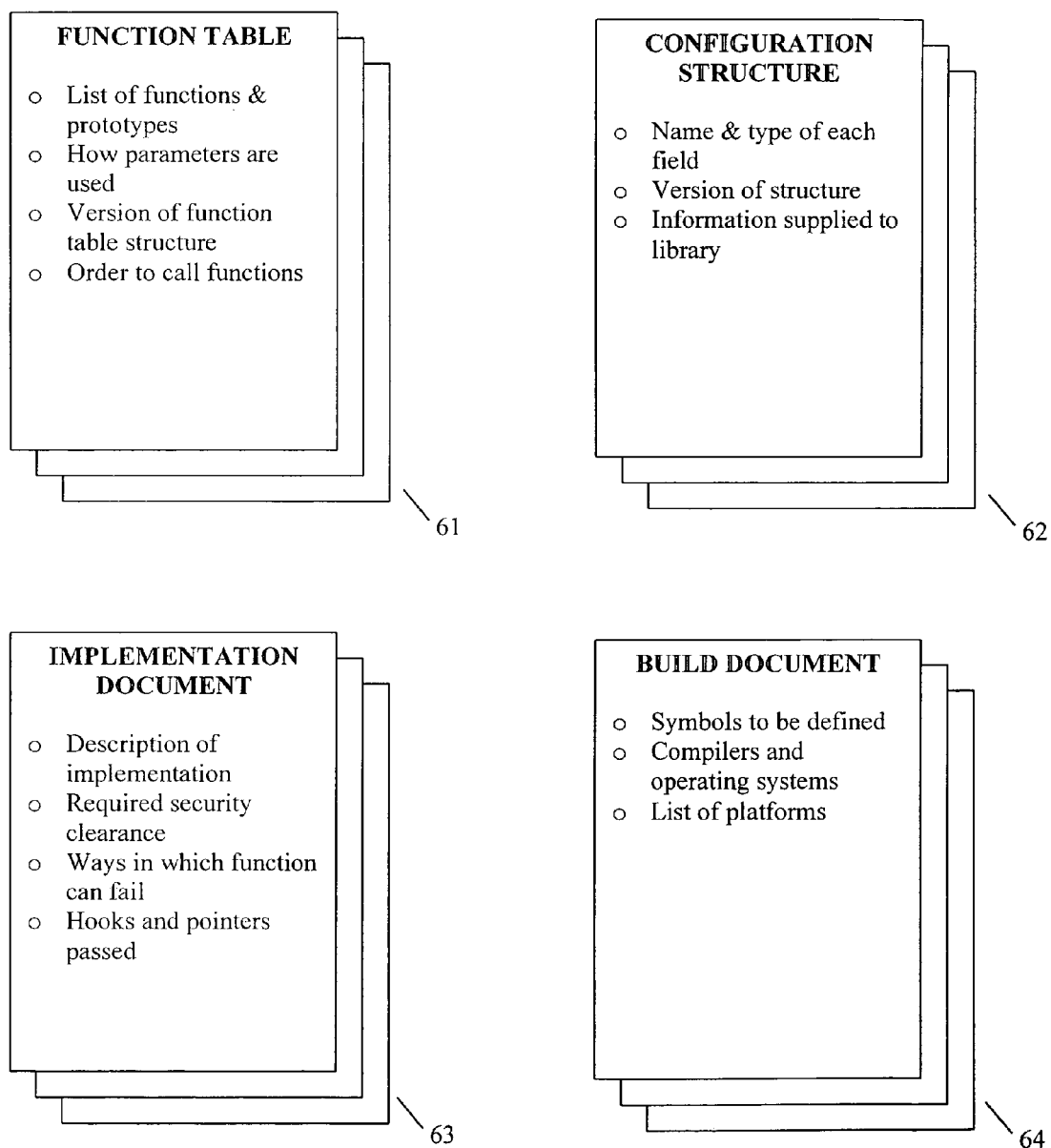
FIG. 6 shows a block diagram illustrating support documents used in connection with an apparatus for reusing a computer software library, according to an embodiment of the present disclosure.

Four sets of electronic documents may preferably be created to support the use of each PIA compliant library. These documents are to be in a format that can be viewed from any platform such as HTML. FIG. 6 shows an illustration of these documents. The function table document 61 may document the functionality supported by the functions found in the library as represented in the function table. Within this document, each function found in the library may be listed along with the prototype of that function. A function prototype recites the name used to call the function along with the correct order and form of all parameters and the result used by the function. This document may describe how the parameters are to be used when each function is called. This document may state the version of the function table structure that was first to use the function. This document may describe the order in which the functions may be called when the functions may be called in a particular order.

The configuration structure document 62 may describe the significance of each field within the configuration structure. This document may contain the name and type of each field, the version of the structure that first included the field and a description of what information the field supplies to the library.

The implementation document 63 may describe how the functionality of each function is used. This document may contain a general description of how each function is implemented. This may be any information needed to successfully call the function and achieve the desired result. This document may also specify what security clearance is required to use the function, when security measures are in place to limit access to certain functions. This document may describe the ways in which the function may fail. A function fails when its execution terminates, often abruptly, prior to achieving the desired result. This document may also describe what hooks and pointers were passed to the library through the configuration structure that the function may be dependent upon.

A build document 64 may describe how to compile the library for each platform that the library supports. The library may be compiled for a number of different platforms. Because different platforms may use symbols differently, certain symbols may be defined for specific platforms. This document may contain a listing of what symbols may be defined before the library can be compiled for the various platforms. This document may specify which compilers are known to properly compile the library and the operating system versions used to run the compilers. The document may also include a list of platforms that the library is known to run on.

Effective use of the PIA may require that the library source code be properly managed. When the library source code is properly managed, changes made to the library may take effect across all platforms that the library can be compiled for.

According to an embodiment of the present disclosure a method for managing source code is disclosed wherein each library may be assigned to an owner who may be primarily responsible for that library's management. This owner may be the programmer who developed the library. The owner may be given the responsibility of making sure the library continues to function properly across all supported applications and platforms. Therefore, the owner may be responsible for making changes to the official source code for the library. Other programmers working on library improvements may work with copies of the source code and may present improvements to the owner for approval. Once approved, the owner may update the official source code to reflect the approved improvements.

Conflicts may arise between multiple developers wishing to modify the same library in different ways to reflect improvements in different products. When such a conflict emerges, the product with the nearer release date may be allowed to modify the library first.

The owner may also have the responsibility of assisting other developers in determining if the library is suitable for use in other applications.

To aid in the proper management of the library, each library may have a three-part version number. The first part may indicate the latest version of the function table structure that the library supports. The second part may indicate the latest version of the configuration structure that the library supports. The third part may indicate the latest version of the compiled library made since the last function table or configuration structure change.

Developers within an organization may be able to ascertain whether a preexisting PIA compliant library is available that may accomplish a desired result before they engage in creating a new library. A good method for informing developers within an organization about the presence of PIA compliant libraries is to publish knowledge of these libraries to a database. Optimally, this database may be searchable using a web-based system so that developers may easily access this database across a variety of platforms.

This database may preferably have one record per library. Fields within the record may preferably contain information that may facilitate searching for a desired library and the quick understanding of the library's functionality. The following are some examples of useful fields: library owner, computer language used to write the library, version of PIA that the library conforms to, what C++ templates were used, what STLs (standard template libraries) were used, what MFCs (Microsoft foundation classes) were used, what platforms are supported, thread safety of the library, documentation of the library, description of what the library does, known incompatibilities between library versions and application versions, dependencies of the library i.e. the names of the function table structures that are required by the library, the name of the function table structure that the library exports, the name of the configuration structure that the library uses, issues that were resolved in subsequent library versions, and issues that were resolved by modifications to the environment.

In addition to assisting developers in locating a library that is potentially useful for use in a new application, the database is a good tool for people who support software products. By searching through the database, it is possible for support personnel to ascertain what library updates may be useful for solving a particular client's problem.

Figure 7:
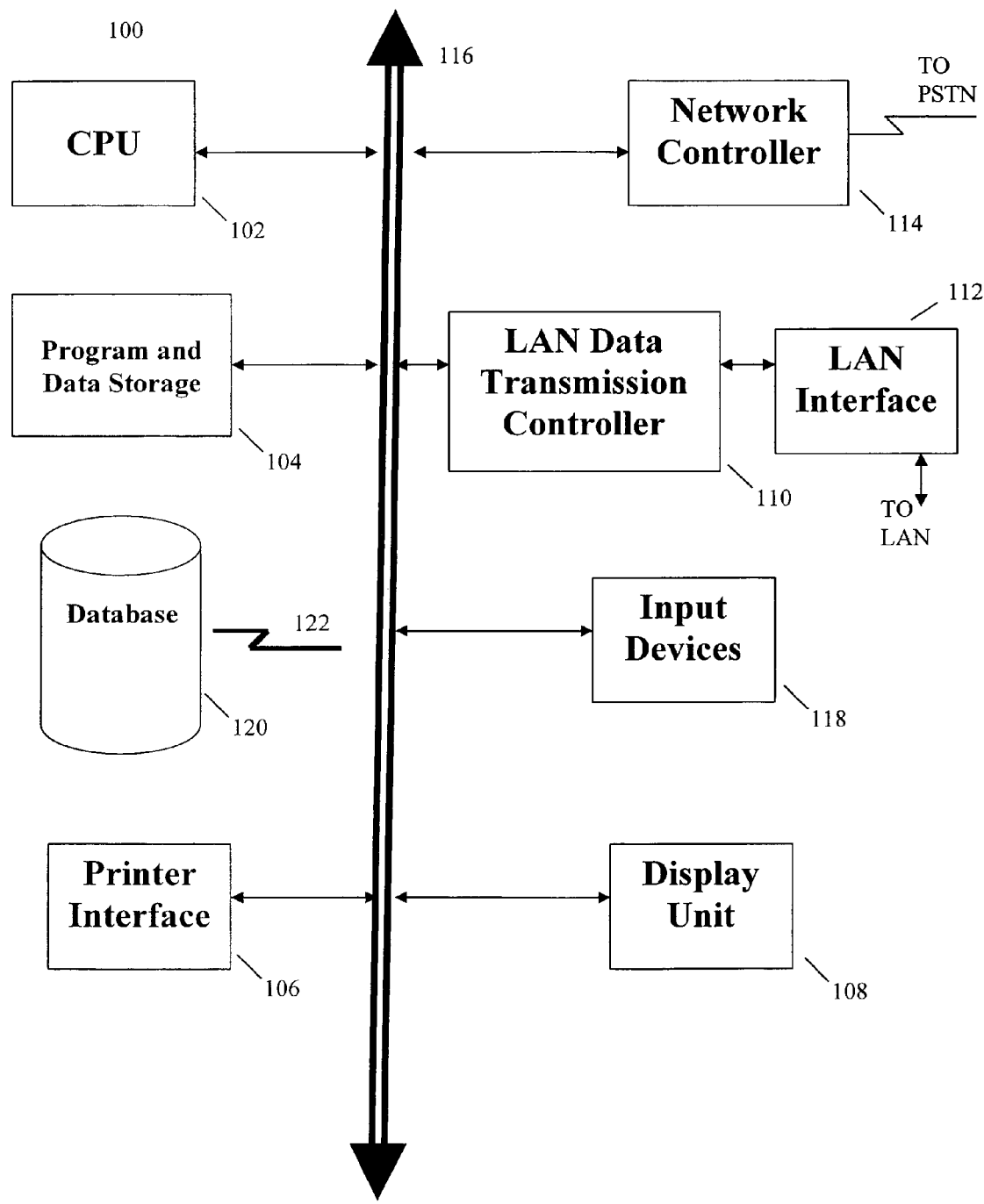
FIG. 7 shows a block diagram of an exemplary computer system capable of implementing the methods and apparatuses of the present disclosure.

FIG. 7 shows an example of a computer system 100 which may implement the methods and apparatuses of the present disclosure. The apparatuses and methods of the present disclosure may be implemented in the form of a software application running on a computer system, for example, a mainframe, personal computer (PC), handheld computer, server, etc. The software application may be stored on a recording media locally accessible by the computer system, for example, floppy disk, compact disk, hard disk, etc., or may be remote from the computer system and accessible via a hard wired or wireless connection to a network, (for example, a local area network, or the Internet, etc) or another transmission medium.

The computer system 100 can include a central processing unit (CPU) 102, program and data storage devices 104, a printer interface 106, a display unit 108, a (LAN) local area network data transmission controller 110, a LAN interface 112, a network controller 114, an internal bus 116, and one or more input devices 118 (for example, a keyboard, mouse etc.). As shown, the system 100 may be connected to a database 120, via a link 122.

The specific embodiments described herein are illustrative, and many additional modifications and variations can be introduced on these embodiments without departing from the spirit of the disclosure or from the scope of the appended claims. Elements and/or features of different illustrative embodiments may be combined with each other and/or substituted for each other within the scope of this disclosure and appended claims.

What is claimed is:

1. A method for creating a reusable library, comprising:
providing with at least one processor one or more functions;
providing with the at least one processor a function table for the provided one or more functions; and providing with the at least one processor a configuration structure for communicating values between the provided one or more functions and a program that calls the reusable library;

wherein the program that calls the reusable library communicates a function table structure to the reusable library containing information as to which of the one or more functions are desirable and when those of the one or more functions that are not desirable contain dependencies, those dependencies are canceled.

2. The method of claim 1, wherein canceling dependencies of the one or more functions that are not desirable comprises providing reasonable default values for one or more of the dependencies.

3. The method of claim 1, wherein canceling dependencies of the one or more functions that are not desirable comprises disabling one or more of the one or more functions that are not desirable.

4. The method of claim 1, further comprising providing a function for initializing variables and constants used by the reusable library.

5. The method of claim 4, wherein the function for initializing variables and constants generates an error code when one or more of the variables and constants are not able to initialize.

6. The method of claim 4, wherein one or more entry points call an abort command when said function for initializing variables and constants is not called.

7. The method of claim 1, further comprising providing a function for de-initializing variables and constants used by the reusable library.

8. The method of claim 1, wherein the program calling the reusable library sends a hook to external data to the reusable library to allow the reusable library to make use of the external data.

9. The method of claim 1, wherein the program calling the reusable library calls one or more of the one or more functions using a function call name.

10. The method of claim 1, wherein the reusable library does not check to see if the configuration structure allows for all of the one or more functions to communicate with the program calling the reusable library.

11. The method of claim 1, wherein the reusable library may be called by the program calling the reusable library over a computer network.

12. The method of claim 11, wherein the reusable library generates an error code when there is a disruption in the computer network.

13. The method of claim 1, further comprising;
documenting functionality supported by the one or more functions;
documenting significance one or more fields of the configuration structure;
documenting implementation of the one or more functions; and
documenting how the library may be compiled for one or more platforms.

14. A method for modifying a conventional library with one or more, functions for reuse, comprising:
decoupling with at least one processor a library from at least one of a dependant application or one or more other libraries; and
providing with the at least one processor a configuration structure for communicating values between the one or more functions and a program that calls the reusable library;

wherein the program that calls the reusable library communicates a function table structure to the reusable library containing information as to which of the one or more functions are desirable and when those of the one or more functions that are not desirable contain dependencies, those dependencies are canceled.

15. The method of claim 14, wherein canceling the dependencies of the one or more functions that are not desirable comprises providing reasonable default values for one or more of the dependencies.

16. The method of claim 14, wherein canceling the dependencies of the one or more functions that are not desirable comprises disabling one or more of the one or more functions that are not desirable.

17. The method of claim 14, further comprising providing a function for initializing variables and constants used by the reusable library.

18. The method of claim 17, wherein the function for initializing variables and constants generates an error code when one or more of the variables and constants are not able to initialize.

19. The method of claim 17, wherein one or more entry points call an abort command when said function for initializing variables and constants is not called.

20. The method of claim 14, further comprising providing a function for de-initializing variables and constants used by the reusable library.

21. The method of claim 14, wherein the program calling the reusable library sends a hook to external data to the reusable library to allow the reusable library to make use of the external data.

22. The method of claim 14, wherein the program calling the reusable library calls one or more of the one or more functions using a function call name.

23. The method of claim 14, wherein the reusable library does not check to see if the configuration structure allows for all of the one or more functions to communicate with the program calling the reusable library.

24. The method of claim 14, wherein the reusable library may be called by the program calling the reusable library over a computer network.

25. The method of claim 24, wherein the reusable library generates an error code when there is a disruption in the computer network.

26. The method of claim 14, further comprising;
documenting functionality supported by the one or more functions;
documenting significance one or more fields of the configuration structure;
documenting implementation of the one or more functions; and
documenting how the library may be compiled for one or more platforms.

27. A reusable library system, comprising:
at least one computer-readable non-transitory storage medium comprising:
one or more functions;
a function table for the one or more functions; and
a configuration structure for communicating values between the one or more functions and a program that calls the reusable library;
wherein the program that calls the reusable library communicates a function table structure to the reusable library containing information as to which of the one or more functions are desirable and when those of the one or more functions that are not desirable contain dependencies, those dependencies are canceled.

28. The system of claim 27, wherein canceling the dependencies of the one or more functions that are not desirable comprises providing reasonable default values for one or more of the dependencies.

29. The system of claim 27, wherein canceling the dependencies of the one or more functions that are not desirable comprises disabling one or more of the one or more functions that are not desirable.

30. The system of claim 27, further comprising a function for initializing variables and constants used by the reusable library.

31. The system of claim 30, wherein the function for initializing variables and constants generates an error code when one or more of the variables and constants are not able to initialize.

32. The system of claim 30, wherein one or more entry points call an abort command when said function for initializing variables and constants is not called.

33. The system of claim 27, further comprising a function for de-initializing variables and constants used by the reusable library.

34. The system of claim 27, wherein the program calling the reusable library sends a hook to external data to the reusable library to allow the reusable library to make use of the external data.

35. The system or claim 27, wherein the program calling the reusable library calls one or more of the one or more functions using a function call name.

36. The system of claim 27, wherein the reusable library does not check to see if the configuration structure allows for all of the one or more functions to communicate with the program calling the reusable library.

37. The system of claim 27, wherein the reusable library may be called by the program calling the reusable library over a computer network.

38. The system of claim 37, wherein the reusable library generates an error code when there is a disruption in the computer network.

39. The system of claim 27, further comprising;
a function table document documenting functionality supported by the one or more functions;
a configuration structure document documenting significance one or more fields of the configuration structure;
an implementation document documenting implementation of the one or more functions; and
a build document documenting how the library may be compiled for one or more platforms.

40. A computer system comprising:
a processor; and
a program storage device readable by the computer system and including computer executable code executable by the processor for creating a reusable library, the computer executable code comprising:
code for providing one or more functions;
code for providing a function table for the provided one or more functions; and
code for providing a configuration structure for communicating values between the provided one or more functions and a program that calls the reusable library;
wherein the program that calls the reusable library communicates a function table structure to the reusable library containing information as to which of the one or more functions are desirable and when those of the one or more functions that are not desirable contain dependencies, those dependencies are canceled.

41. The computer system of claim 40, wherein canceling the dependencies of the one or more functions that are not desirable comprises providing reasonable default values for one or more of the dependencies.

42. The computer system of claim 40, wherein canceling the dependencies of the one or more functions that are not desirable comprises disabling one or more of the one or more functions that are not desirable.

43. The computer system of claim 40, further comprising code for providing a function for initializing variables and constants used by the reusable library.

44. The computer system of claim 43, wherein the function for initializing variables and constants generates an error code when one or more of the variables and constants are not able to initialize.

45. The computer system of claim 43, wherein one or more entry points call an abort command when said function for initializing variables and constants is not called.

46. The computer system of claim 40, further comprising code for providing a function for de-initializing variables aid constants used by the reusable library.

47. The computer system of claim 40, wherein the program calling the reusable library sends a hook to external data to the reusable library to allow the reusable library to make use of the external data.

48. The computer system of claim 40, wherein the program calling the reusable library calls one or more of the one or more functions using a function call name.

49. The computer system of claim 40, wherein the reusable library does not check to see if the configuration structure allows for all of the one or more functions to communicate with the program calling the reusable library.

50. The computer system of claim 40, wherein the reusable library may be called by the program calling the reusable library over a computer network.

51. The computer system of claim 50, wherein the reusable library generates an error code when there is a disruption in the computer network.

52. The computer system of claim 40, further comprising;
code for documenting functionality supported by the one or more functions;
code for documenting significance one or more fields of the configuration structure;
code for documenting implementation of the one or more functions; and
code for documenting how the library may be compiled for one or more platforms.

53. A computer system comprising:
a processor; and
a program storage device readable by the computer system, including computer executable code executable by the processor for modifying a conventional library with one or more functions for reuse, the computer executable code comprising:
code for decoupling a library from at least one of a dependant application or one or more other libraries; and
code for providing a configuration structure for communicating values between the one or more functions and a program that calls the reusable library;
wherein the program that calls the reusable library communicates a function table structure to the reusable library containing information as to which of the one or more functions are desirable and when those of the one or more functions that are not desirable contain dependencies, those dependencies are canceled.

54. The computer system of claim 53, wherein canceling the dependencies of the one or more functions that are not desirable comprises providing reasonable default values for one or more of the dependencies.

55. The computer system of claim 53, wherein canceling the dependencies of the one or more functions that are not desirable comprises disabling one or more of the one or more functions that are not desirable.

56. The computer system of claim 53, further comprising code for providing a function for initializing variables and constants used by the reusable library.

57. The computer system of claim 56, wherein the function for initializing variables and constants generates an error code when one or more of the variables and constants are not able to initialize.

58. The computer system of claim 56, wherein one or more entry points call an abort command when said function for initializing variables and constants is not called.

59. The computer system of claim 53, further comprising code for providing a function for de-initializing variables and constants used by the reusable library.

60. The computer system of claim 53, wherein the program calling the reusable library sends a hook to external data to the reusable library to allow the reusable library to make use of the external data.

61. The computer system of claim 53, wherein the program calling the reusable library calls one or more of the one or more functions using a function call name.

62. The computer system of claim 53, wherein the reusable library does not check to see if the configuration structure allows for all of the one or more functions to communicate with the program calling the reusable library.

63. The computer system of claim 53, wherein the reusable library may be called by the program calling the reusable library over a computer network.

64. The computer system of claim 63, wherein the reusable library generates an error code when there is a disruption in the computer network.

65. The computer system of claim 53, further comprising;
code for documenting functionality supported by the one or more functions;
code for documenting significance one or more fields of the configuration structure;
code for documenting implementation of the one or more functions; and
code for documenting how the library may be compiled for one or more platforms.

* * * * *